March 14, 1944. R. G. LE TOURNEAU 2,344,046
CLUTCH AND POWER TRANSMISSION UNIT
Filed June 9, 1942 3 Sheets-Sheet 2

INVENTOR.
R. G. LeTourneau
BY
ATTORNEYS

March 14, 1944.  R. G. LE TOURNEAU  2,344,046
CLUTCH AND POWER TRANSMISSION UNIT
Filed June 9, 1942  3 Sheets-Sheet 3

INVENTOR.
R. G. LeTourneau
BY
*Corbett & Corbett*
ATTORNEYS

Patented Mar. 14, 1944

2,344,046

UNITED STATES PATENT OFFICE 2,344,046

CLUTCH AND POWER TRANSMISSION UNIT

Robert G. Le Tourneau, Peoria, Ill., assignor to R. G. Le Tourneau, Inc., Stockton, Calif., a corporation Application June 9, 1942, Serial No. 446,340

7 Claims. (Cl. 192—66)

This invention relates to a power transmitting mechanism, my principal objects being to provide a cone clutch having a novel form of control or actuating device, and a novel clutch and gearing combination between a drive and a driven shaft arranged so that the driven shaft may be rotated in opposite directions from the drive shaft without reversing the latter and without shifting any gears.

A further object is to provide a clutch so constructed that both the drive and driven members may be mounted on a single shaft intermediate the ends of the latter, so that said shaft may continue beyond either or both ends of the clutch if it is desired to mount other clutches or parts thereon.

These objects I accomplish by means of such structure and relative arrangement of parts as will fully appear by a perusal of the following specification and claims.

In the drawings similar characters of reference indicate corresponding parts in the several views.

Figure 1:
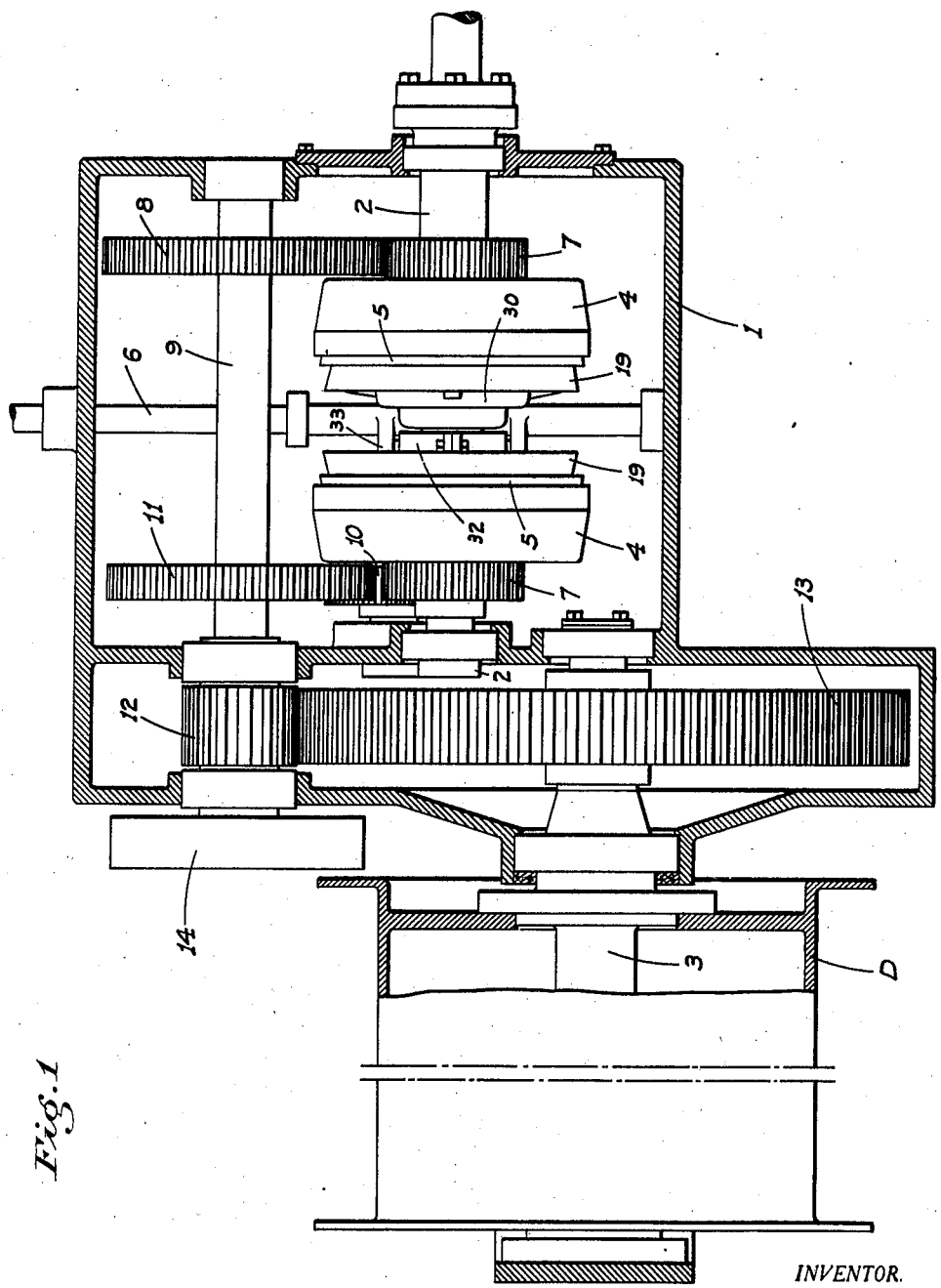
Figure 1 is an assembly view of a clutch and transmission unit as applied to a reversible cable drum, the enclosing housing of the unit being shown in section.

Referring now more particularly to the characters of reference on the drawings, the transmission structure as here illustrated comprises a housing 1 in which a drive shaft 2 is supported; a driven shaft 3 parallel to the shaft 2 being also supported from the housing in radially offset relation to the shaft 2 and beyond the same. In the present instance a cable drum D is mounted on the outer end of the driven shaft.

Turnable on the shaft 2 within the housing in facing relation to each other are female clutch elements 4, while splined on said shaft between the elements 4 are cooperating clutch elements 5. These are adapted to be alternately moved into engagement with the corresponding element 4 by means which will be described in detail later, and whose movements are controlled by the rotation of a shaft 6 journaled in and projecting from the housing and disposed at right angles to the shaft 2 on one side of the same in a plane centrally between the elements 4.

Opposed ends of the elements 4 carry pinions 7. One pinion meshes directly with a gear 8 fixed on a countershaft 9 journaled in the housing parallel to the shaft 2 and radially offset therefrom in a plane different from that of the shaft 3. The other pinion 7 engages an idler pinion 10 which meshes with another gear 11 on the shaft 9. A pinion 12 on the shaft 9 meshes with a gear 13 fixed on the shaft 3. A brake drum 14 is preferably mounted on the outer end of the counter-shaft and is provided with a suitable brake mechanism (not shown) to control the speed of said shaft and consequently that of the shaft 3 when released from the drive shaft by the disengagement of the clutches.

All the gears remain constantly in mesh and it will be seen that if one clutch is engaged, the shaft 3 will be driven in one direction, while if the other one is engaged said shaft will be driven in the opposite direction. The use of a single control shaft for the two clutches positively prevents both clutches from being simultaneously engaged, as will be evident, and no master clutch is necessary with this type of transmission.

Figure 2:
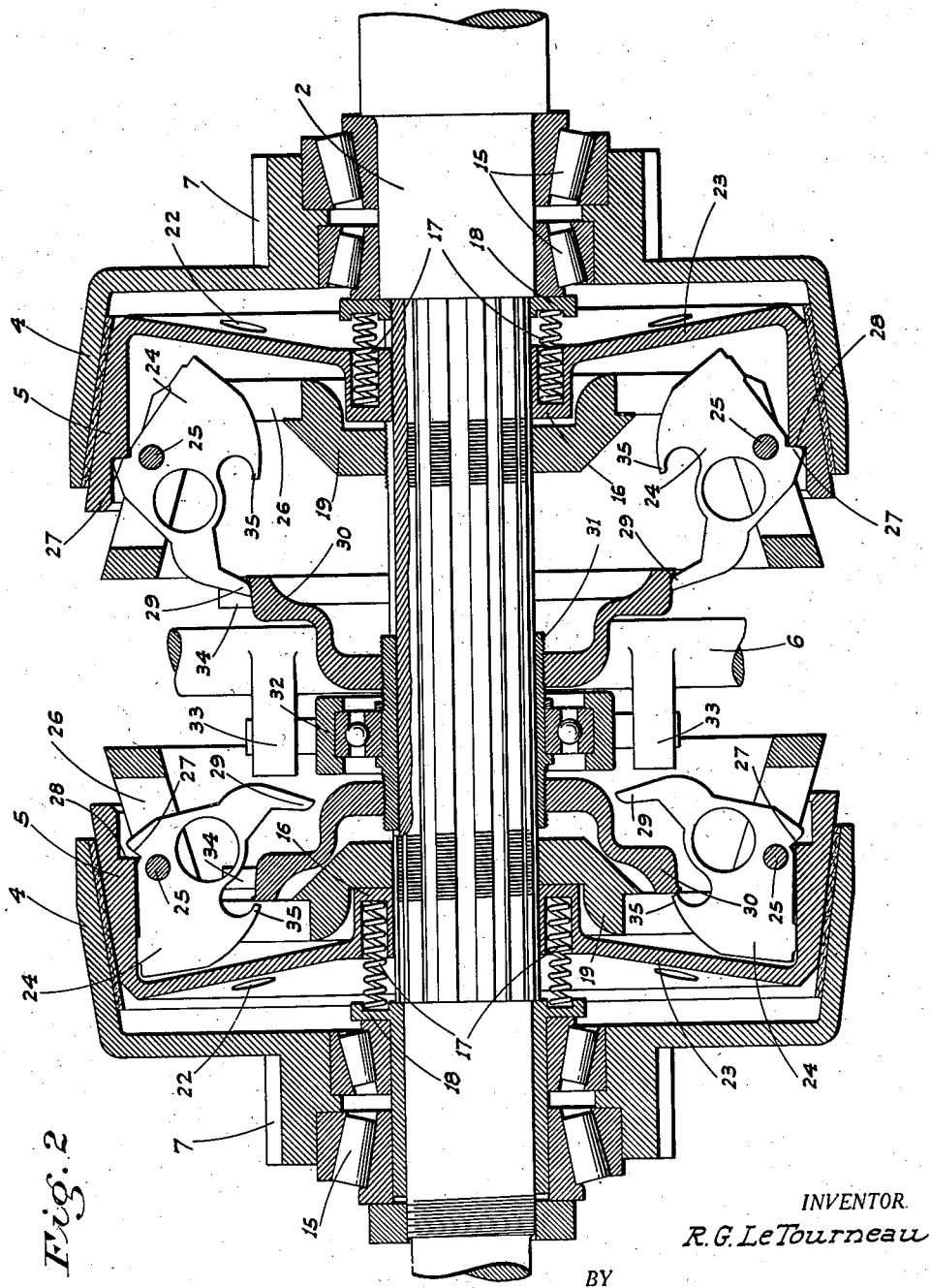
Figure 2 is an enlarged sectional elevation of a dual clutch unit.

Each clutch is constructed and controlled as follows: As stated, the female element 4 of the clutch is turnable on the shaft 2 and is also held against axial movement, by suitable bearings 15. The hub 16 of the male element 5 is splined on the shaft, as shown in Fig. 2, said element being normally held away from the element 4 by compression springs 17 between the hub and a spring engaging collar 18 rotating with said shaft.

Figure 4:
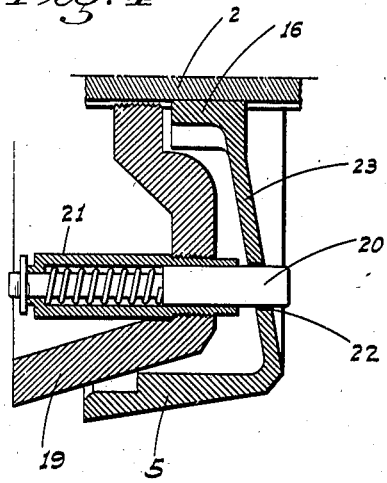
Figure 4 is a fragmentary radial section of the carrier and the adjacent male clutch element, taken as on a line 4—4 of Figure 3.

Adjustably screwed on the shaft 2 in front of the hub 16 is a dog carrying member 19 of cupped-disc form, normally held against rotation on the shaft by means of a spring advanced, manually retractible pin 20. This pin is mounted in a casing 21 secured on the member 19 so that the pin is parallel to the shaft 2, said pin normally projecting into an opening 22 provided in the web 23 of the male clutch element 5. (See Fig. 4.) A plurality of dogs 24 are mounted by pivot pins 25 on the member 19 in radially disposed and evenly spaced relation thereabout, the dogs projecting through slots 26 cut in said member. Each dog has a short substantially radial face 27 disposed radially out from and close to the pin 25, to engage the adjacent radially disposed face 28 of an annular recess or step cut in the element 5.

Formed with each dog and projecting in a general direction away from the clutch and toward the shaft 2 is a finger 29, the outer end of which is a much greater distance from the pivot 25 than the face 28. This finger rides on the outer periphery of a cam ring 30 which is adjustably screwed on a sleeve 31 splined on the shaft 2. A collar 32 is turnably mounted on the sleeve and is engaged by fork elements 33 projecting from the shaft 6 and thus providing a shift arrangement of substantially conventional character.

Figure 5:
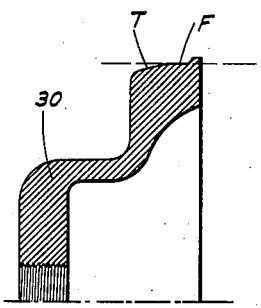
Figure 5 is an enlarged fragmentary radial section of the cam disc.

The finger engaging surface of the ring 30 is formed with a taper T, as shown in Fig. 5, sloping away from the shaft toward the clutch. This taper gradually decreases until it merges into a flat surface F at the end of the ring nearest the clutch, which surface is parallel to the shaft. As the ring moves lengthwise of the shaft 2 and away from the clutch, as controlled by rotation of the shaft 6, finger 29 which engages the ring surface is gradually moved farther from the shaft 2, while the clutch-engaging face advances and forces the clutch element 5 into the element 4. The great difference between the radial distance from the pivot 25 to the face 28 and between said pivot and the finger 29 provides a great clutch-engaging leverage, which is aided by the decreasing taper on the cam ring as the clutch becomes fully engaged. When the clutch is fully engaged the finger rides on the flat surface F, so that there is no tendency for the clutch to become disengaged, and such disengagement can only be effected by a positive advance of the cam ring toward the clutch until the taper portion is again under the finger. It will here be understood that while the action of the cam ring has been described in connection with one finger only, all the fingers are simultaneously acted on and they all act in unison to force the male clutch element into gripping engagement with the female element.

Figure 3:
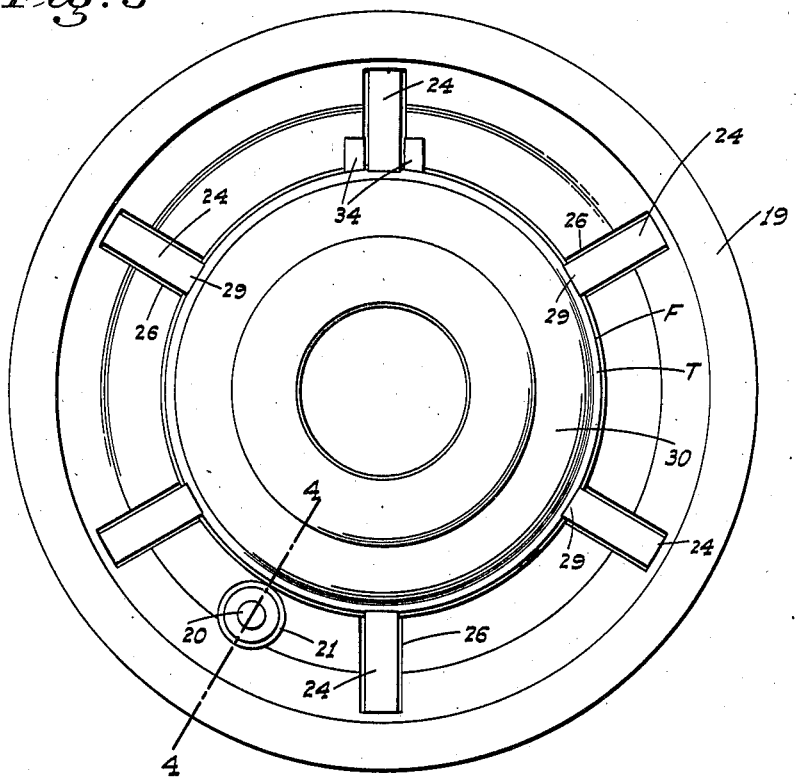
Figure 3 is an end view of the dog carrier and cooperating cam disc, detached.

When adjusting the clutch after wear, both the cam ring and the dog carrier 19 must be adjusted to the same extent along the shaft so as not to disturb the relationship between the fingers of the dogs and the slope of the cam ring. Simultaneous and easy adjustment of these parts is accomplished by mounting a pair of lugs 34 on the cam ring on opposite sides of any one dog, as shown in Fig. 3. In this manner when adjusting rotation is imparted to the member 19 the cam ring will be necessarily rotated and adjusted to the same extent.

The clutch engaging dogs 24 are counterweighted to provide a nice balance, which serves a useful purpose. When the clutch is engaged the greater part of the weight mass of each dog is disposed beyond the pivot 25, on the side thereof away from the clutch. The centrifugal force generated by rotation of the clutch then tends to increase the pressure on the male member 5 and helps to engage the clutch. When the clutch is fully disengaged, however, the greater part of the weight mass of the dogs is on the near side of the pivot 25, toward the clutch. In this case the centrifugal force tends to keep the dogs fully disengaged so that there is no possibility of them causing the clutch to drag.

To insure positive movement of the dogs to a release position as the cam ring is moved toward the clutch, each dog is provided with an extension 35 opposed to the corresponding finger 29; and in the path of movement of the ring. This, in the event that any dog should stick and fail to swing to a release position when the cam ring moves clear of the finger, said ring will engage the extension 35 and force the dog to thus swing.

While I have above described the structure and operation of a single clutch, it will be evident, from an inspection of Fig. 2, that a pair of these clutches may be disposed in facing relation to each other and arranged so that the single sleeve 31, to which the throw-out device is connected, will serve as a support for the cam rings of both clutches. It will also be evident that due to this arrangement, movement of said sleeve 31 in a direction to engage one clutch will necessarily cause a disengagement of the other clutch, and vice versa, so that it will be impossible for both clutches to be engaged simultaneously. It will also be understood that the total throw permitted the sleeve 31 is such that both clutches may be in neutral or disengaged simultaneously.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A clutch comprising, with a drive shaft, a pair of cooperating clutch elements on the shaft normally turnable relative to each other, means mounting one element for axial movement on the shaft toward and from the other element, a carrier mounted on the shaft separate from the elements and normally rotating with the one element and disposed on the side thereof opposite the other element, dogs pivoted in the carrier and extending radially thereof, each dog having a face radially out from its pivot to engage a radial surface on the one element and shift the latter toward the other clutch element upon swinging of the dog about its pivot in one direction, and manually controlled means mounted on the shaft to thus swing the dogs.

2. A clutch comprising, with a drive shaft, a pair of cooperating clutch elements on the shaft normally turnable relative to each other, means mounting one element for axial movement on the shaft toward and from the other element, pivoted dogs extending radially of the shaft, means mounting the dogs in connection with the shaft for rotation therewith, each dog having a face radially out from its pivot to engage a radial surface on the one element and shift the latter toward the other clutch element upon swinging of the dog about its pivot in one direction, a finger formed on the dog and projecting radially inward from its pivot and toward the shaft in a direction away from the clutch elements, and a manually controlled cam ring mounted for sliding movement on the shaft and having a circumferential face on which the dog fingers ride at their end, said face having a slope toward the shaft in a direction away from the clutch elements.

3. A clutch comprising, with a drive shaft, a pair of cooperating clutch elements, one normally turnable on the shaft and the other splined on the shaft beyond the one element, a carrier mounted on the shaft beyond the other clutch element, dogs pivotally mounted on the carrier to engage the other element and shift the same into engagement with the one element upon swinging of the dogs in one direction, and means to thus swing the dogs comprising a shift sleeve splined on the shaft beyond the carrier, a dog engaging cam ring and means securing the ring on the sleeve for adjusted movement along the same.

4. A clutch comprising, with a drive shaft, a pair of cooperating clutch elements, one normally turnable on the shaft and the other splined on the shaft beyond the one element, a carrier adjustably mounted on the shaft beyond the other clutch element, dogs pivotally mounted on the carrier to engage the other element and shift the same into engagement with the one element upon swinging of the dogs in one direction, means to thus swing the dogs comprising a shift sleeve splined on the shaft beyond the carrier and a dog engaging cam ring adjustably mounted on the sleeve; and means operatively connecting the carrier and ring whereby adjustment of the carrier will effect equivalent adjustment of the ring.

5. A clutch as in claim 4 with releasable means connecting the carrier and said other clutch element to normally prevent adjustment of the carrier relative thereto.

6. A clutch comprising, with a drive shaft, a pair of cooperating clutch elements, one normally turnable on the shaft and the other splined on the shaft beyond the one element, a carrier mounted on the shaft beyond the other clutch element for adjustment along the same upon rotation of the carrier on the shaft, dogs pivotally mounted on the carrier to engage the other element and shift the same into engagement with the one element upon rotation of the dogs in one direction, means to thus rotate the dogs comprising a shift sleeve splined on the shaft beyond the carrier and a dog engaging cam ring mounted on the sleeve for adjustment along the same upon rotation of the ring on the sleeve, lugs projecting radially from the ring on opposite sides of and adjacent one dog and overlapping the same and a manually releasable pin normally connecting the carrier and said other clutch element and preventing relative rotation thereof.

7. A clutch as in claim 1, with means mounting the carrier for adjusted movement along the shaft and relative to the clutch elements.

ROBERT G. LE TOURNEAU.